United States Patent [19]

Shimada et al.

[11] 4,349,078

[45] Sep. 14, 1982

[54] MOUNTING FOR A HEAT PRODUCING ELEMENT OF AN AUTOMOBILE

[75] Inventors: Junichi Shimada, Ooi; Kazutake Ogawa, Wako, both of Japan

[73] Assignee: Honda Giken Kogyo Kabushiki Kaisha (Honda Motor Co., Ltd.), Tokyo, Japan

[21] Appl. No.: 168,469

[22] Filed: Jul. 10, 1980

[30] Foreign Application Priority Data

Jul. 16, 1979 [JP] Japan ............................ 54/96773[U]

[51] Int. Cl.³ ............................................ B60K 13/04
[52] U.S. Cl. ................................... 180/69.1; 180/89.2; 181/282; 296/39 A
[58] Field of Search ...................... 180/54 A, 296, 299, 180/300, 69.1, 89.2; 296/39 R, 39 A; 181/282; 165/52, 154, 157

[56] References Cited

U.S. PATENT DOCUMENTS

| | | | |
|---|---|---|---|
| 3,204,901 | 9/1965 | Dunn | 180/89.2 X |
| 3,669,204 | 6/1972 | Andrews | 180/69.1 |
| 3,677,365 | 7/1972 | Wright et al. | 181/282 X |
| 3,863,445 | 2/1975 | Heath | 180/89.2 X |
| 3,874,624 | 4/1975 | Gianessi | 180/69.1 X |
| 3,977,486 | 8/1976 | Kleinschmit | 180/89.2 X |
| 4,029,167 | 6/1977 | Fox et al. | 180/89.2 X |
| 4,116,411 | 9/1978 | Masuda | 180/89.2 X |

FOREIGN PATENT DOCUMENTS 1442929  7/1976  United Kingdom ............... 180/296

Primary Examiner—Joseph F. Peters, Jr.
Assistant Examiner—Michael Mar
Attorney, Agent, or Firm—Armstrong, Nikaido, Marmelstein & Kubovcik

[57] ABSTRACT

A mounting for a heat producing element of an automobile is described, in which elastic support members of rubber or an elastomeric material are positioned externally of a heat shield in a position in which they are exposed to unobstructed air flow beneath the automobile, and are isolated from radiant heat produced by the heat producing element in a manner minimizing the conduction of heat from said heat producing element.

7 Claims, 5 Drawing Figures

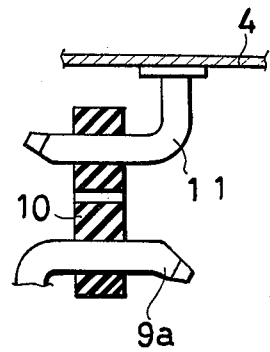
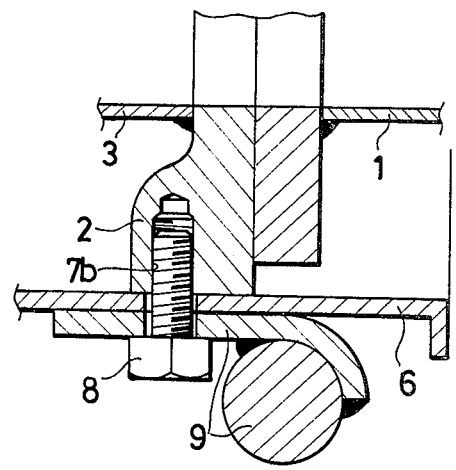
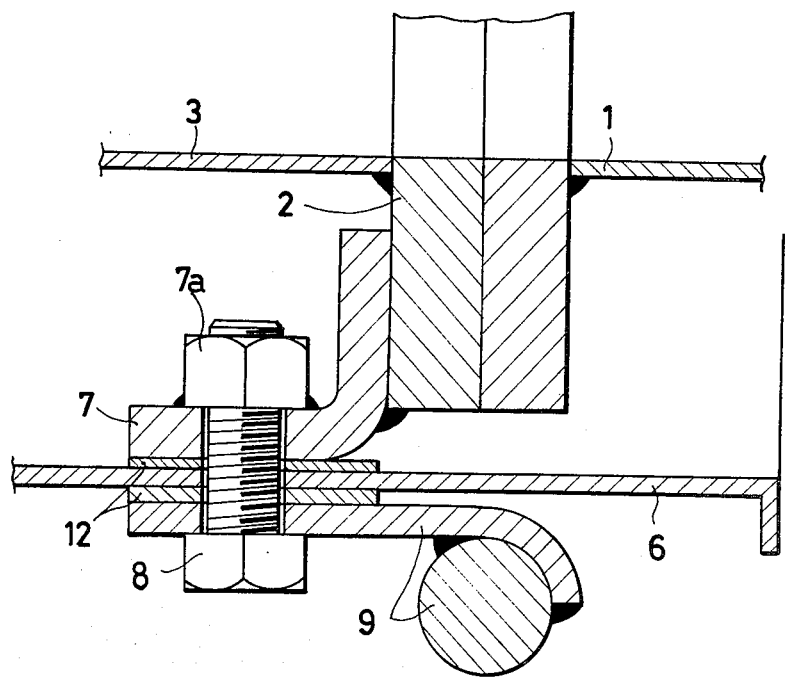

MOUNTING FOR A HEAT PRODUCING ELEMENT OF AN AUTOMOBILE

BACKGROUND OF THE INVENTION

This invention relates to a mounting for a member of an automobile which generates heat in operation, such as a catalytic converter, thermal reactor or the like. Such members as are in common usage can reach a temperature sufficiently high to ignite dried grass, leaves, or other combustible material, with a consequential hazard to the safety of the occupants of the automobile, and possible disastrous consequences to grassland or forested areas.

While the requirement for some form of heat shield has been recognized, prior proposals have been that the heat shield be located at a position beneath the conventional resilient support for the heat generating member. However, when located in that position, the elastic members of the resilient support are exposed to radiant heat from the said heat generating member, and, a rapid deterioration of the elastic members occurs. Commonly the elastic members are fabricated from an elastomeric material, rubber or a rubber-like compound being typical for use in this application.

SUMMARY OF THE INVENTION

According to the present invention, deterioration of the elastic member of the resilient support due to those members being exposed to radiant heat is mitigated or eliminated by positioning those members at the side of the heat shield remote from the heat generating element, and in a position in which they are exposed to air flow beneath the automobile. In addition to mitigating or eliminating the exposure of the elastic members to radiant heat, at the same time the exposure of the elastic members to conducted heat is minimized, the majority of the conducted heat being dissipated by the heat shield.

DESCRIPTION OF THE DRAWINGS

A preferred embodiment of the present invention will now be described with reference to the accompanying drawings, in which:

FIG. 3 is a sectional view taken along the line III—III in FIG. 2, FIG. 4 is a sectional view illustrating a modification of the manner of attachment of the mounting to the heat generating member, and FIG. 5 is a sectional view showing another modification thereof.

DESCRIPTION OF THE PREFERRED EMBODIMENTS

Figure 1:
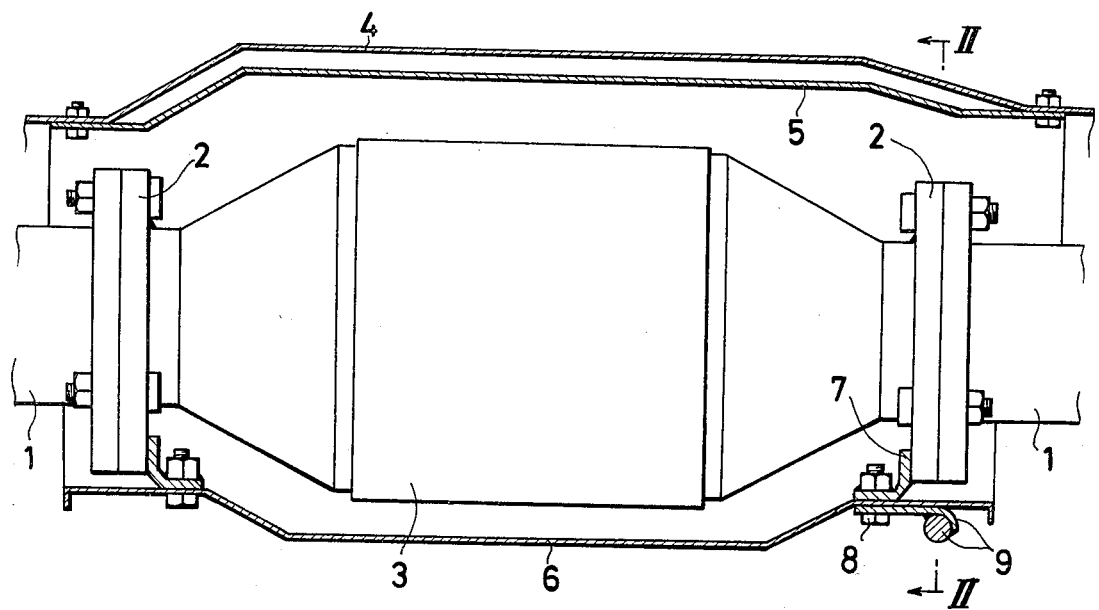
FIG. 1 is a side view, partly in section, of a mounting according to the present invention.

Referring now to the drawings, FIG. 1 shows spaced sections of exhaust pipe 1 of an automobile, between which is interposed a heat generating member 3, such as a catalytic converter, thermal reactor or the like, the sections of exhaust pipe and the heat generating member having mating flanges 2 at the ends thereof, which are clamped to each other by any convenient securing means, such as the nuts and bolts illustrated.

The heating generating member 3 is positioned within an arcuate upper thermal interception plate 5, which is attached to the car body 4 by nuts and bolts or any other convenient attachment members. As will be seen more clearly in FIG. 2, the interception plate extends around the heat generating member in spaced relationship therewith, and terminates in downwardly extending flanges.

Figure 2:
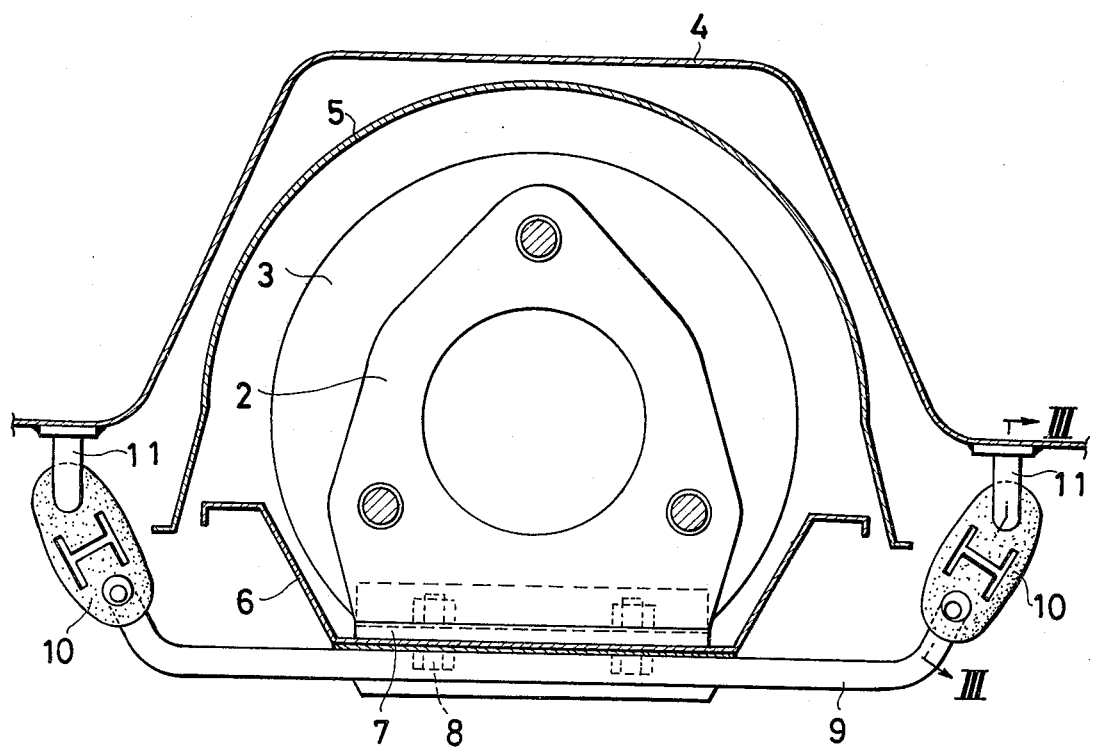
FIG. 2 is a sectional view taken along the line II—II in FIG. 1.

In the embodiments of FIGS. 1 and 2, a stay 7 is attached to the respective flanges by welding of the stay 7 to the associated flange 2, the stay 7 providing a support for a lower heat shield plate 6 which is attached to the respective stays by nuts and bolts 8. Alternatively, the nuts may be omitted, and the bolts 8 screwed directly into threaded openings in the flange 7.

As is more clearly shown in FIG. 2, the lower thermal interception plate 6 has upwardly extending flanges at its longitudinal edges, those flanges extending upwardly into the downwardly extending flanges of the upper thermal interception plate 5, thus completely shrouding the heat generating member 3 except for ventilation openings provided by the spacing of the respective flanges.

Secured to one of the stays 7 by means of the bolts 8 is a mounting bracket 9, the mounting bracket being positioned on that side of the thermal interception plate 6 which faces away from the heat generating member 3, the lower thermal interception plate 6 being sandwiched between the mounting bracket 9 and the associated stay 7. The mounting bracket 9 extends laterally of the thermal interception plate 6, the lateral extensions being supported by elastic members 10 which are supported from the body of the automobile by hooked projections 11 which are welded or otherwise secured to the body of the automobile. The ends of the extensions 9 similarly are hooked, as shown at 9a in FIG. 3, such that the elastic member 10 is securely retained on the associated hooked portion 9a and the cooperating hooked member 11.

As an alternative to the provision of stays 7 welded to the flanges 2, the flanges 2 may themselves be provided with a threaded bore 7a in which the bolt 8 is received, as illustrated in FIG. 4.

Further, for the purpose of minimizing conduction of heat from the flanges 2 to the lower thermal interception plate 6 and to the mounting bracket 9, thermal insulating gaskets 12,12 can be interposed between the stay 7 and the plate 6 on the one hand, and between the plate 6 and the mounting bracket 9 on the other hand, as illustrated in FIG. 5.

While not illustrated in the drawings, the lower thermal interception plate 6 can be provided with longitudinally extending ribs or indentations for the purpose of further facilitating the dissipation of heat therefrom.

Upon operation of the automobile, with a consequential rise in temperature of the heat generating member 3, heat radiated from the heat generating member 3 is intercepted by the upper and lower thermal interception plates 5 and 6, and is dissipated into the air flow beneath the automobile. By virtue of the spacing between the flanges of the upper and lower thermal interception plates 5 and 6, conduction of heat from the upper thermal interception plate 5 to the lower thermal interception plate 6 does not occur, the spacing between the respective flanges also accommodating movement of the heat generating member 3 relatively to the automobile body 4, as permitted by the resilient mounting members 10.

While some heat will be conducted to the mounting member 9 from the associated flange 2, that heat will be dissipated to a great extent into the air flow beneath the automobile, with a consequence that the lateral extensions of the mounting bracket 9 will be at a temperature substantially lower than that of the central portion thereof.

Additionally, the resilient mounting members 10 which are positioned directly in the air flow beneath the automobile, are completely shielded from radiated heat emanating from the heat generating member 3, such that the mounting members 10 are effectively isolated from both radiant and conducted heat, thus materially extending their useful life.

It will be understood that the description of the embodiments illustrated in the drawings is to be taken by way of example only, and, that various modifications of the specific structures described can be effected without departing from the scope of the invention as defined in the appended claims.

What we claim is:

1. A mounting for a heat-producing element of an automobile exhaust system which includes an upper heat shield fixedly mounted above the heat-producing element to the underside of the automobile in spaced relationship therewith, said upper shield having downwardly extending flanges paralleling a longitudinal axis of the heat-producing element and covering an upper surface and a substantial portion of the side surfaces of said heat-producing element, said mounting comprising
a lower heat shield rigidly attached to said heat-producing element in spaced relationship therewith covering a lower surface thereof and having a bottom portion and upwardly extending flanges at its longitudinal edges extending upwardly into said flanges of said upper heat shield defining therebetween ventilation openings,
a mounting bracket positioned adjacent the side of said lower heat shield remote from said heat-producing element and having lateral extensions perpendicular to said longitudinal axis, and
elastic members connected to said lateral extensions and attached to a body member of the automobile,
said upwardly extending flanges having portions which extend laterally for shielding said elastic members from heat radiated from said heat-producing element, said ventilation openings extending longitudinally and opening downwardly, said bottom portion and said flanges of said lower heat shield dissipating heat conducted from said heat producing element, said mounting bracket and said elastic members being positioned completely exteriorly of said heat shields and exposed to air flow beneath the automobile.

2. The mounting according to claim 1, further comprising:
axially spaced flanges of said heat producing element,
means securing one end of said lower heat shield to one of said flanges,
and means securing an opposite end of said lower heat shield and said mounting bracket to the other of said flanges.

3. The mounting according to claim 2, further comprising:
a stay secured to said other flange of the heat producing element,
bolts and lock nuts constituting said securing means,
said bolts extending through said mounting bracket and said lower heat shield and being secured in apertures in the stay by said lock nuts.

4. The mounting according to claim 2, further comprising:
extensions of said one flange having threaded apertures therein, said securing means comprising bolts received within said threaded apertures and which extend through said heat shield.

5. The mounting according to claim 2, further comprising:
extensions of said other flange having threaded apertures therein,
said securing means comprising bolts received within said threaded apertures and which extend through said heat shield and said mounting bracket.

6. The mounting according to claim 1, further comprising:
hooked portions formed on said lateral extensions of the mounting bracket and which are received in apertures in the respective elastic members,
and hooked members supported by the automobile body and which extend through apertures in said elastic members, the respective apertures in the elastic members being spaced from each other.

7. The mounting according to claim 1, further comprising:
thermal insulation gaskets interposed between said heat producing element, said lower heat shield, and said mounting bracket.

* * * * *